Dec. 5, 1961     O. HEIL     3,012,170
CHARGED PARTICLE BEAM MODULATING MEANS AND METHOD
Filed Aug. 29, 1958     5 Sheets-Sheet 1
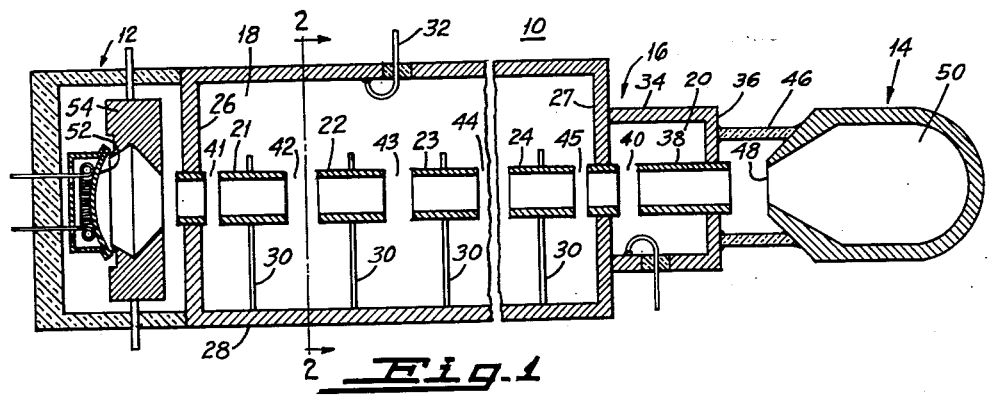
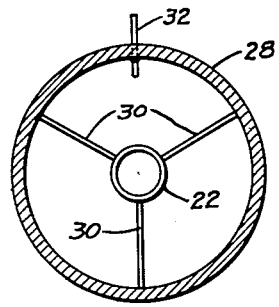
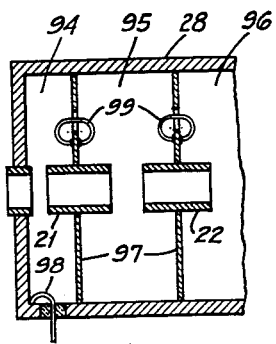
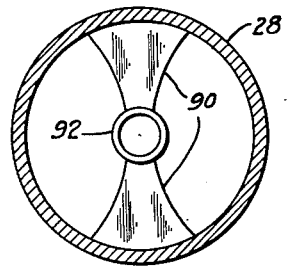
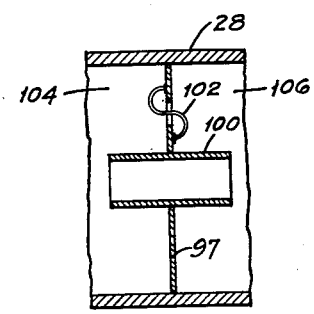
INVENTOR.
OSKAR HEIL
BY
Leon F. Herbert
ATTORNEY Dec. 5, 1961     O. HEIL     3,012,170
CHARGED PARTICLE BEAM MODULATING MEANS AND METHOD Filed Aug. 29, 1958     5 Sheets-Sheet 2

INVENTOR.
OSKAR HEIL

BY

Leon F. Herbert
ATTORNEY

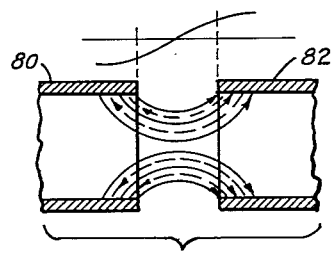
Fig.10
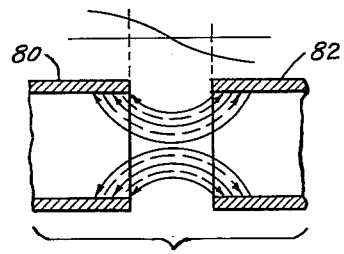
Fig.10-A
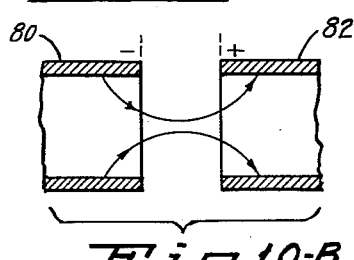
Fig.10-B
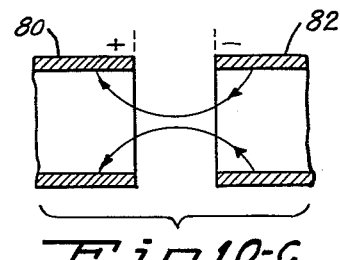
Fig.10-C
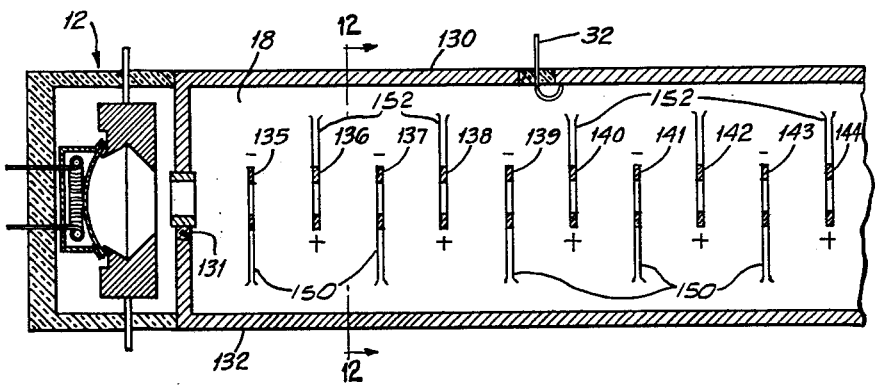
Fig.11
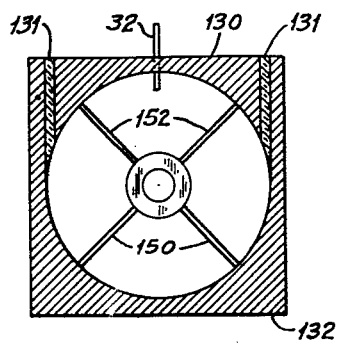
Fig.12
INVENTOR.
OSKAR HEIL
BY
Leon F. Herbert
ATTORNEY Dec. 5, 1961  O. HEIL  3,012,170
CHARGED PARTICLE BEAM MODULATING MEANS AND METHOD
Filed Aug. 29, 1958  5 Sheets-Sheet 5

INVENTOR.
OSKAR HEIL
BY
Leon F. Herbert
ATTORNEY

United States Patent Office 3,012,170
Patented Dec. 5, 1961

3,012,170
CHARGED PARTICLE BEAM MODULATING MEANS AND METHOD
Oskar Heil, San Mateo, Calif., assignor to Eitel-McCullough, Inc., San Bruno, Calif., a corporation of California
Filed Aug. 29, 1958, Ser. No. 758,160
19 Claims. (Cl. 315—5.41)

This invention relates to the art of modulating beams of charged particles, and more particularly to an improved method of and means for modulating a beam to cause the particles thereof to form two bunches for each cycle of the driving frequency.

According to this invention, velocity modulation of the beam of charged particles is used. Since velocity modulation of electron beams is well known in the art, the invention will be particularly described with respect to beams composed of electrons.

The modulation of this invention differs from the velocity modulation used in prior art devices in that the velocity modulation imposed upon the beam according to this invention is compensated by a second velocity modulation which opposes the first. The second velocity modulation again is opposed by a third velocity modulation, and so on. The result of this multiple opposed velocity modulation is a bunching process resulting in two bunches per cycle of the modulating frequency. This can be called second order effect velocity modulation.

The advantage of the modulation according to this invention as compared to normal velocity modulation is that velocity spread within the bunches becomes gradually smaller at the same rate as the bunches become denser so that in the finished bunches, contrary to ordinary bunches, there is very little velocity spread among the electrons. This results in higher efficiency than in ordinary klystrons. This increase in efficiency is due to the fact that, first, the bunches are closer packed than can be obtained with ordinary velocity modulation, and, second, the electrons of the bunches have a smaller velocity spread, which enables power to be more efficiently extracted from the bunches.

Ordinary velocity modulation leads to radial defocusing of the phase focused electrons. This is an unavoidable effect and is caused by the nature of electric fields. It is undesirable since it tends to make the bunches spread radially and adds to the beam spread. Such beam spreading makes necessary high magnetic or direct current focusing fields in order to counteract the effect. According to this invention, however, simultaneous radial and phase focusing occurs. Therefore, one beneficial result of this invention is that less focusing means, such as magnetic fields or additional direct current lens focusing, are required.

The output of the device according to this invention may be utilized in a variety of ways, one of which is to drive a resonant cavity or other circuit element at twice the driving frequency or to feed a klystron having two or more cavities tuned to operate at a frequency which is twice that of the driving frequency. In addition, the output of a device according to this invention could be fed directly into a particle accelerator. Further, the output of the device according to the subject invention could be acted upon in such a manner as to velocity modulate the bunches as a whole. In other words, the output of the device could be acted upon in such a way as to accelerate certain of such bunches and decelerate others, thereby producing new bunches or in other words "bunching the bunches" in order to return the frequency of operation to the driving frequency or a lower frequency. These new bunches could be used to drive a circuit element such as a resonant cavity or to feed a klystron tuned to the driving frequency, for example, resulting in a device having a very high total efficiency.

This invention possesses other features of advantage, some of which, with the foregoing, will be set forth in the following description of this invention. It is to be understood that the invention is not limited to the disclosure of species herein, as variant embodiments thereof may be adopted within the scope of the claims.

Referring to the drawings:

FIGURE 1 is a cross-sectional view of a device according to one embodiment of this invention;

FIGURE 2 is a cross-sectional view taken along lines 2—2 of FIGURE 1;

FIGURE 3 is a cross-sectional view similar to FIGURE 2 showing structural features according to another embodiment of this invention;

FIGURE 4 is a fragmentary cross-sectional view of a device according to still another embodiment of this invention;

FIGURE 5 is a fragmentary cross-sectional view of a still further embodiment of this invention;

Figure 13:
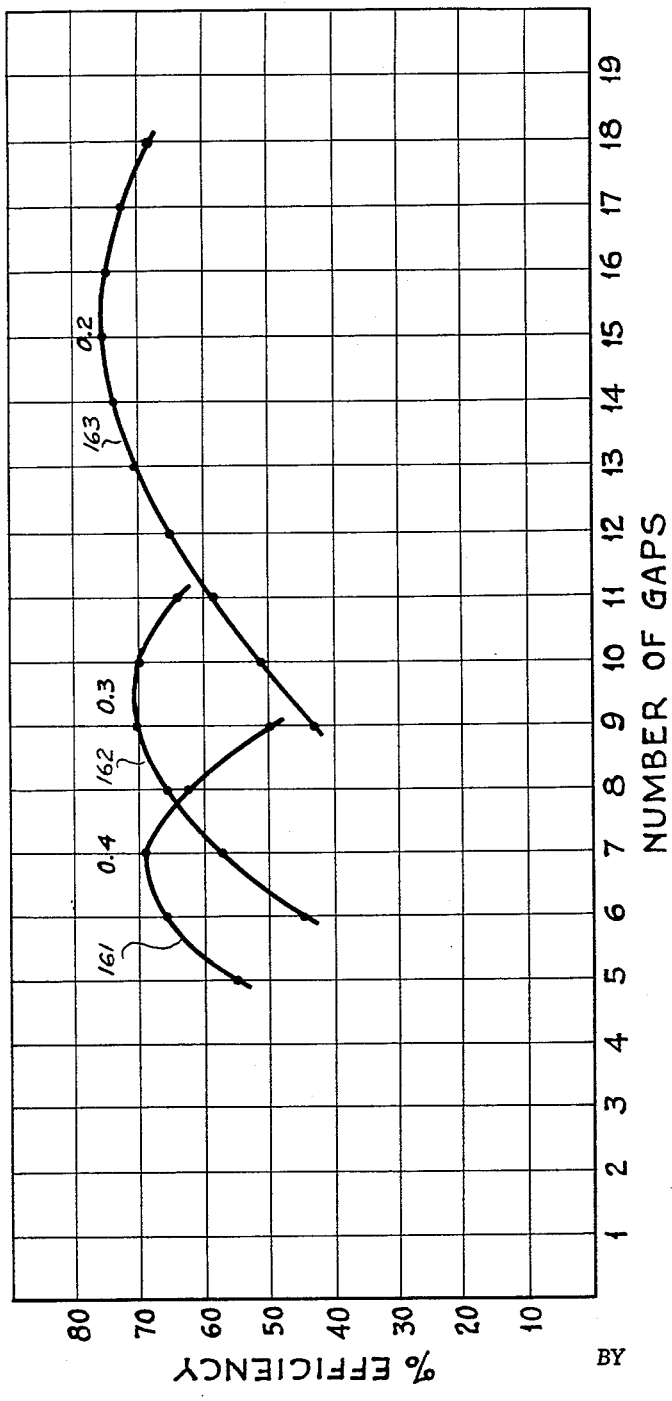
Figure 14:
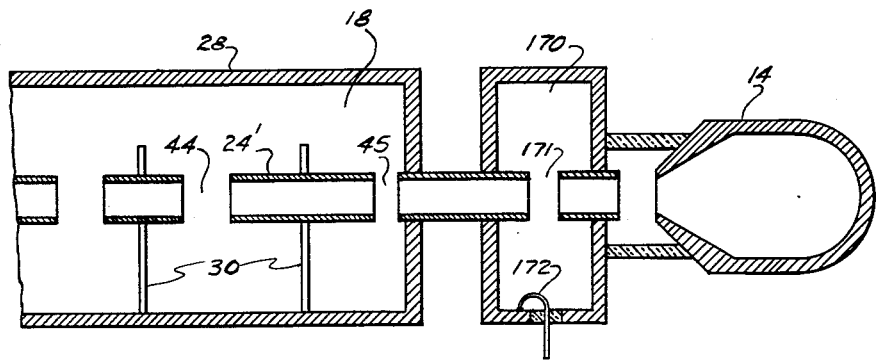
Figure 15:
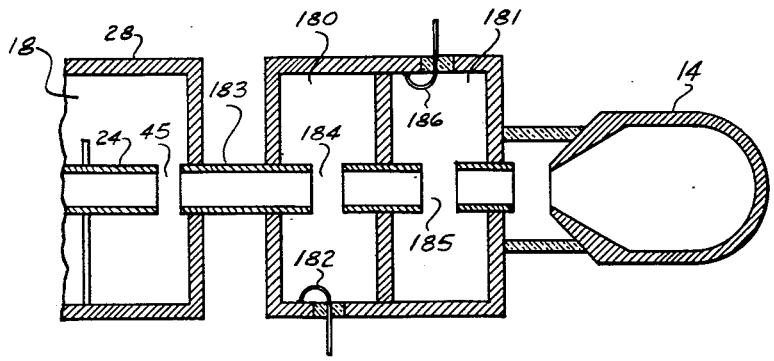
Figure 16:
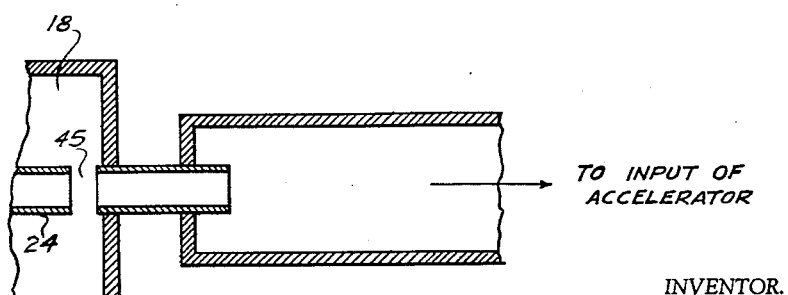

FIGURES 10, 10-A, 10-B and 10-C are schematic representations of certain operational features of this invention;

FIGURE 11 is a fragmentary cross-sectional view of a still further embodiment of this invention;

FIGURE 12 is a cross-sectional view taken along lines 12—12 of FIGURE 11;

FIGURE 13 is a graph illustrating design data for devices according to this invention;

FIGURE 14 is a fragmentary cross-sectional view of an embodiment of the subject invention illustrating one means of extracting output power therefrom;

FIGURE 15 is a fragmentary cross-sectional view of an embodiment of this invention showing another means of extracting output power therefrom;

FIGURE 16 is a fragmentary cross-sectional view illustrating still another method of utilizing the output of a device embodying this invention.

Referring to FIGURE 1, the device 10 according to one embodiment of this invention is shown. The device 10 comprises an envelope having an electron gun 12 at one end and a collector electrode 14 at the other. An R.F. interaction means 16 is interposed in the envelope between the electron gun and the collector. The R.F. interaction means 16 comprises a first resonant cavity 18 and a second resonant cavity 20. The first resonant cavity 18 contains a plurality of drift tube sections of which 21, 22, 23 and 24 are shown. The first cavity 18 comprises apertured end walls 26 and 27 and a cylindrical side wall 28. The electron gun is adapted to project a beam of electrons through such apertured end walls and axially of the tubular side walls 28. The drift tube sections are mounted in spaced end-to-end relationship coaxially with the cylindrical side wall of the first resonant cavity so that the electron beam also passes axially through such drift tube sections. The drift tube sections may be supported on metal rods 30 which extend radially from drift tube sections and are mounted on the inner surface of the side wall. For example, referring to FIGURE 2, three metal rods 30 might be used for each drift tube section, such rods extending at angles of 120° with respect to each other. An input coupling loop 32 extends into the first resonant cavity and provides means for coupling the driving frequency into such cavity.

The second resonant cavity 20 comprises a cylindrical side wall 34 having one end mounted directly on the end wall 27 in the first resonant cavity 18. An apertured end wall 36 closes the other end of the cylinder 34. A drift tube section 38 is mounted at the aperture of the end wall 36 of the second resonant cavity 20 and extends coaxially within the cavity to adjacent the apertured end wall 27 of the first cavity to provide an interaction gap 40 within such second cavity 20.

The spaced drift tube sections within the first resonant cavity 18 provide a plurality of interaction gaps 41, 42, 43, 44 and 45 within the first resonant cavity 18, the first of such interaction gaps 41 being between the first drift tube section 21 and the end wall 26 of the first resonant cavity, and the last of such interaction gaps 45 being between the last drift tube section 24 and the end wall 27 of the first resonant cavity. The intermediate gaps 42, 43 and 44 are between adjacent ones of such drift tube sections. It should be understood that any number of drift tube sections and thus any number of interaction gaps may be used. In fact, as will be pointed out hereinafter, an increased number of gaps will result in increased efficiency.

The collector electrode may be insulated from the second resonant cavity as by means of an insulating cylinder 46 sealed at one end to the end wall 36 of the second resonant cavity and at the other end to such collector electrode 14. The collector electrode 14 may comprise, for example, a hollow metal member having an opening 48 coaxially in line with the resonant cavities 18 and 20. The enclosed volume 50 in the collector 14 may be large with respect to the opening 48 to thereby provide for the trapping of the electron beam and prevent the escape of secondaries back into the R.F. interaction means 16.

The electron gun 12 may comprise a cathode disk 52 having a concave surface coated with thermionic emissive material. The focus electrode 54 is positioned adjacent the emissive surface of the cathode 52 to form the electrons emitted thereby into a beam of proper diameter to pass through the R.F. interaction means 16 and into the collector 14.

In operation, a high positive voltage is applied to the R.F. interaction means with respect to the cathode. The same high positive voltage may be applied to the collector electrode 14 with respect to the cathode 52. A suitable voltage is applied to the focusing electrode with respect to the cathode such that the electrons emitted by the cathode are formed into a beam which is projected through the R.F. interaction means and into the collector. A driving frequency is fed into the first resonant cavity 18 through the coupling loop 32. Such driving frequency causes the cavity 18 to resonate in a manner well known in the art. The capacity of such resonant cavity is provided by the spacings between the drift sections and between the drift tube sections and the end walls of the cavity. Thus, voltages will be developed across such spaces, which voltages will vary at the driving frequency, and the magnitude of such voltages will depend on the gap spacing.

It will be seen that the drift tube sections 21, 22, 23 and 24 are all of equal length. Furthermore, it will be seen that the spacing between adjacent drift tube sections is always equal. According to this embodiment of the invention the distance from the center of one gap to the center of the next adjacent gap is such that the time required for an electron in an unmodulated beam to traverse such distance at the voltages at which the device is operated is equal to the time required for the operating frequency of the device to complete one half of one cycle, or an uneven whole number multiple thereof such as 3/2, 5/2, 7/2, etc.

The spacings between the first drift tube section 21 and the end wall 26 and between the last drift tube section 24 and the end wall 27 are each equal to half the spacing between adjacent drift tube sections. Thus, the voltage developed between such end walls and such drift tube sections will be half the voltage developed between adjacent drift tube sections. The reasons for this will be more fully discussed hereinafter.

An electron in the beam passing through the first interaction gap 41 will tend to be accelerated or decelerated by the voltage appearing thereacross, as is well known in the art with respect to klystron operation. The electron will then proceed on to the second gap through the first drift tube section 21. However, while the electron is shielded by the first drift tube section the voltage within the cavity will complete a half cycle of oscillation (or uneven multiple thereof) and the electron will tend to arrive at the second interaction gap at a time when the field thereacross is 180° out of phase with respect to the field of the first interaction gap.

Thus, it will be seen that the electron which is accelerated in the first gap will be decelerated in the second gap, and the electron which is decelerated in the first gap will be accelerated in the second gap. At this point it should be remembered that the first interaction gap has half the spacing and therefore half the voltage of the subsequent interaction gap. Therefore, the effect of the field at the first interaction gap will be half that of the next subsequent interaction gap. Thus, the electron which is accelerated by the first interaction gap will be traveling at a higher velocity than its original velocity. When this electron reaches the second interaction gap it will tend to be decelerated twice as much as it was accelerated in the first gap due to the higher field at the second gap, thereby compensating the acceleration given it by the first interaction gap and decelerating it additionally so that upon leaving the second gap it is traveling at a lesser velocity than its original velocity. When such electron reaches the third interaction gap, it will again be accelerated, but this time it will tend to be accelerated as much as it was decelerated in the second gap. Therefore, upon leaving the third interaction gap it will again be going at a higher velocity than its original velocity.

Similarly, an electron which is decelerated in the first interaction gap will tend to be accelerated twice as much in the second interaction gap so that upon leaving the second interaction gap it will be going at a greater velocity than its original velocity. When this electron reaches the third interaction gap, it will tend to be decelerated as much as it was accelerated in the second interaction gap so that upon leaving the third interaction gap it will again be traveling at a lesser velocity than its original velocity.

Thus, it will be seen that the velocity of the electrons will be alternately increased and decreased symmetrically with respect to their original velocity by successive interaction gaps. This is necessary, as will be more fully understood from the explanation to follow, in order for those electrons which are neither accelerated nor decelerated upon passing through the interaction gaps to be properly included in the bunches formed by the accelerated and decelerated electrons. The last interaction gap is also adapted to have half the effect of the intermediate gaps in order to preserve the symmetry of the system.

Figure 6:
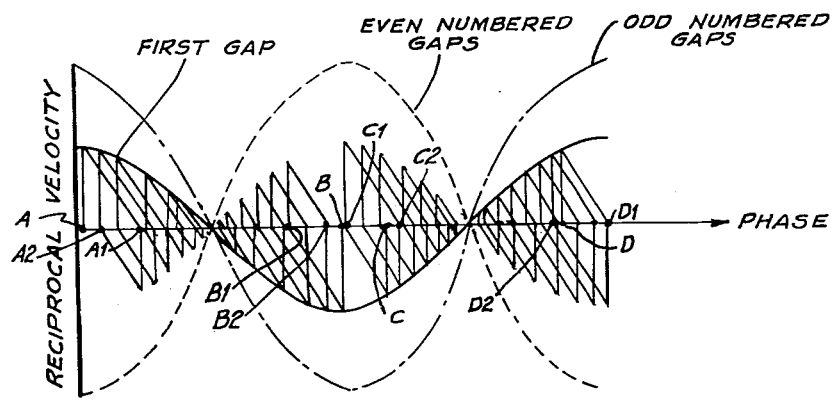
FIGURE 6 is a graphic representation of the electron bunching action according to this invention.

Referring to FIGURE 6, a graphical representation of the bunching action according to this invention is shown. The sine curve drawn in heavy lines is representative of the velocity change imparted to the electrons by the first gap. The sine curve drawn in dotted lines is representative of the velocity change imparted to the electrons in the second gap and subsequent even numbered gaps. And the sine curve drawn in dot-dash lines is representative of the velocity change imparted to the electrons in the third gap and subsequent odd numbered gaps.

From this graph it will be seen that the electrons which are velocity modulated by the first gap will arrive at the second gap in slightly less or slightly more than one-half cycle since the drift tube length has been selected so that an electron having the original velocity of the beam will travel from the first gap to the second gap in exactly one-half cycle. Thus, since the voltages at the first and second gaps are exactly in phase, an electron which is accelerated in the first gap will arrive at the second gap slightly before the voltage on the second gap has become exactly 180° out of phase with the voltage that was present at the first gap when such electron passed through the first gap and the electron which is decelerated in the first gap will arrive at the second gap slightly after the voltage on the second gap has become 180° out of phase. In other words, such electrons may be said to gain in phase with respect to the voltage on the second gap if they are accelerated and to lose in phase if they are decelerated. This change in phase occurs between each gap and the next succeeding gap and results in bunching or phase focusing according to this invention.

Referring to FIGURE 6 in detail, and considering first an electron which passes through the first gap in phase relationship to the voltage thereacross indicated by the point A, such electron receives the maximum possible acceleration in the first gap, as indicated by the vertical line erected at point A. Due to such acceleration the electron will advance in phase with respect to the voltage at the second gap. The voltage at the second gap is represented by the dotted sine curve, and the advance in phase of the electron is represented by the sloped line extending from the perpendicular erected at point A to point $A_1$. Thus, the point $A_1$ represents the phase relationship of the electron's arrival at the second interaction gap to the voltage at the second gap. The slope of the line extending from the perpendicular erected at point A to point $A_1$ is representative of the relationship between the acceleration imparted to the electron at the first interaction gap and the original velocity of such electron.

At the second interaction gap the electron will be decelerated a net amount represented by the vertical line depending from the point $A_1$. The decelerating voltage at the second interaction gap is twice the accelerating voltage at the first gap. Thus, when the deceleration imparted to the electron at the second gap is subtracted from the acceleration imparted to the electron at the first gap, it will be seen that the electron has experienced a net deceleration to a velocity less than its original velocity. However, the electron is not decelerated quite as much below its original velocity by the second gap as it was accelerated above its original velocity by the first gap. This result is due to the phase gain of the electron which causes the electron to arrive at the second gap when the voltage thereacross is not at its maximum as it was in the first gap.

The sloping line drawn from the perpendicular depending from the point $A_1$ is representative of the phase loss of the electron between the second interaction gap and third interaction gap due to the net deceleration imparted to the electron in the second interaction gap. Thus, since the deceleration imparted to the electron in the second gap was not as great as the acceleration imparted to the electron in the first gap, it will be seen that the electron has experienced a net gain in phase with respect to the voltage across the interaction gaps.

The voltage at the third interaction gap and subsequent odd numbered interaction gaps will be the full voltage (i.e., twice that of the first gap, as shown by the dot-dash sine curve). However, it should be remembered that, as explained heretofore, the deceleration imparted to the electron by the second gap (or preceding even numbered gap) must be overcome by such acceleration, thus causing the velocity of the electron to tend to vary symmetrically with respect to its original velocity.

As is clearly shown in FIGURE 6, the net velocity to which the electron is accelerated in the third gap (as indicated by the vertical line at $A_2$) is not quite as high as the velocity to which it was accelerated in the first gap. However, it is again accelerated with respect to the original velocity and again experiences a phase gain with respect to voltage at the fourth interaction gap. Thus, at the fourth interaction gap it is not decelerated as much below its original velocity as it was accelerated above its original velocity in the third gap and another net gain in phase results.

Such net gains in phase will continue to result as the electron passes through the succeeding odd and even numbered gaps. This is indicated by the remaining vertical and sloping lines, and it will be seen that the acceleration and deceleration imparted to the electron will successively decrease until the electron has reached a phase relationship to the voltage across the interaction gap at which it will no longer be either accelerated or decelerated in passing through the interaction gaps. Furthermore, the electron will tend to be traveling at its original velocity.

Let us now consider the electron which enters the first interaction gap in such phase relationship to the voltage thereat as to receive the maximum decelerating effect of such first interaction gap. This electron enters the first interaction gap at the point on the graph of FIGURE 6 indicated by the letter B. The amount of deceleration of such electron is represented by the vertical line depending from point B, and the sloping line extending from the end of such vertical line represents the phase loss of such electron due to such deceleration. Point $B_1$ represents the phase relationship of such electron to the voltage at the second interaction gap where it is accelerated by a field, which tends to be twice the field of the first interaction gap. However, it will be seen that due to the phase loss of such electron the accelerating field at the second interaction gap is not twice the decelerating voltage of the first interaction gap. Therefore, when deceleration of the first interaction gap is subtracted from the acceleration of the second interaction gap, the net acceleration imparted to the electron at the second interaction gap will be less than the deceleration imparted to the electron at the first interaction gap. Thus, when the electron arrives at the third interaction gap represented by the point $B_2$, it will have experienced a net loss of phase. As the electron proceeds on to the subsequent even and odd numbered gaps it will continue to experience loss of phase and decreasing velocity modulation, as shown by the succeeding vertical and sloping lines, until it reaches a phase relationship at which it is no longer velocity modulated and is traveling at its original velocity.

Those electrons which enter the first interaction gap at points in phase relation to the voltage thereacross which are between points A and B mentioned above will also be subjected to the effects described above. Those electrons entering the first interaction gap with a phase relation between that indicated by point A and the voltage null will gain in phase, and those entering between the voltage null and point B will lose in phase substantially, as represented in FIGURE 6 beginning at points between point A and point B such as $A_1$, $A_2$, $B_1$, $B_2$, etc. It will be seen that all of such electrons regardless of their starting point tend to arrive at the same velocity and phase relationship with respect to the voltage across the interaction gaps. In other words, the electrons passing through the first interaction gap during the above described half cycle of the operating frequency tend to be phase focused or bunched together.

Let us now consider an electron which enters the first interaction gap at the point indicated by the letter C in FIGURE 6, where its phase relationship with respect to the half voltage on the first interaction gap is such that it experiences less than the greatest deceleration possible in the first interaction gap. Such electron will be decelerated an amount represented by the vertical line depending from the point C. As shown by the sloped line extending from the end of such vertical line to point $C_1$, such electron will tend to lose in phase and thus arrive at the second interaction gap when the full voltage thereat is more than twice the voltage it was subjected to at the first interaction gap. Therefore, the electron will experience a net acceleration at the second gap, which net acceleration will be greater than the deceleration imparted to the electron by the first interaction gap. Thus, the electron will not only experience a gain in phase between the second and third interaction gaps but such gain in phase between the second and third gaps will be greater than the loss in phase between the first and second gaps. At the third interaction gap, indicated by point $C_2$, the electron will again be subjected to the full field and will experience a net deceleration. However, such net deceleration will be less than the net acceleration of the second gap due to the phase gain of the electron, and the loss in phase of the electron between the third and fourth gaps will be less than the gain in phase between the second and third gaps. Thus, such electron will continue to gain in phase as it proceeds through subsequent odd and even gaps and will approach a phase relationship with respect to the second null of the voltage across the interaction gaps where it will no longer experience acceleration or deceleration.

Considering now the electron which enters the first interaction gap at the point indicated by the letter D, where its phase relationship with respect to the half voltage at the first interaction gap is such that it experiences less than the maximum possible acceleration at such first interaction gap, such electron will be accelerated at the first interaction gap an amount represented by the vertical line erected at the point D. Due to such acceleration the electron will gain in phase with respect to the full voltage across the second interaction gap. When such electron arrives at the second interaction gap, indicated by point $D_1$, it will be decelerated an amount more than twice as much as it was accelerated at the first interaction gap. Thus, the electron will experience a net deceleration which is greater than the acceleration imparted to the electron in the first gap, and will lose in phase between the second and third gaps more than it gained in phase between the first and second gaps. At the third interaction gap indicated by point $D_2$ the electron will again be subjected to full voltage and will experience a net acceleration. However, such net acceleration will be less than the net deceleration of the second gap. Therefore, such electron will experience a net loss in phase with respect to the voltage across the fourth interaction gap and will continue to lose in phase as it proceeds through subsequent odd and even numbered gaps. Thus, the electron will tend to approach the same phase relationship with respect to the second null in the voltage across the interaction gaps as did the electron passing through the first interaction gap at the point indicated by the letter C.

Similarly, all of those electrons passing through the first interaction gap in a phase relationship between that represented by the points indicated by the letters C and D will all tend to approach the same phase relationship with respect to the second voltage null across the interaction gaps. Thus, such electrons will tend to be phase focused, or bunched together, as were the electrons having a phase relationship between points A and B.

From the above description it will be seen that two bunches of electrons will tend to be formed for each cycle of operating frequency. Furthermore, it will be seen that as the bunches of electrons are phase focused, the velocity differential between the electrons of the bunches becomes smaller and smaller so that in the ultimate bunch the electrons are all traveling at substantially the same velocity.

It might be argued that there could be an electron which would enter the first interaction gap with such phase relationship to the voltage thereacross that it would gain or lose in phase exactly the right amount so as to arrive at the second interaction gap in such phase relationship that it would experience exactly twice the deceleration or acceleration at the second interaction gap as it experienced at the first and thus experience no net change in phase. However, such a state of equilibrium would be extremely difficult for an electron to maintain in view of the difficulty in getting all of the interaction gaps to be precisely opposite each other by proper positioning and spacing of the drift tube sections. Thus, the likelihood of such equilibrium being reached is extremely doubtful. It should be readily seen from the above discussion that all of the forces acting on the electrons of the beam of a device according to this invention will tend to make them enter into one bunch or another without undue mechanical design requirements in fabricating the device although some degrees of velocity spread among the bunched electrons may be unavoidable.

Another feature of the operation of a device according to this invention is that it tends to radially focus the electron beam simultaneously with the phase focusing or bunching thereof. This is entirely contrary to the action of a conventional klystron which tends to radially defocus the beam in operation, thus requiring the use of strong magnetic or direct current focusing field.

Figure 7:
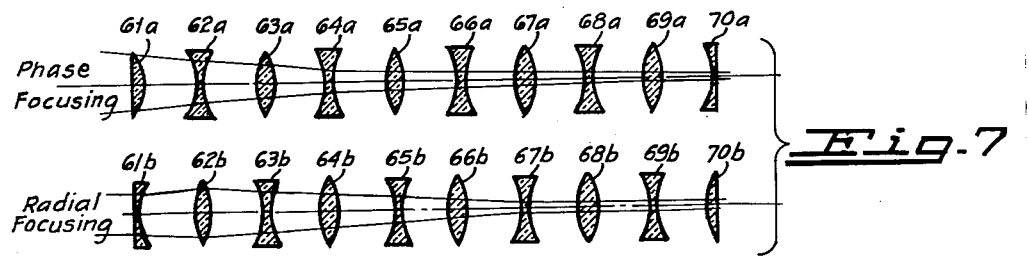
FIGURE 7 is a schematic representation of a system of optical lenses illustrative of a principal feature of this invention.
Figure 8:
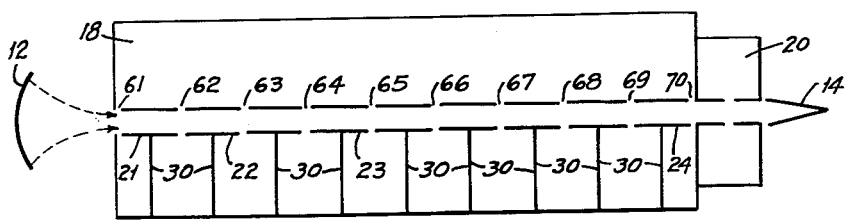
FIGURE 8 is a schematic representation of a device according to the embodiment shown in FIGURE 1.

The simultaneous radial and phase focusing action of a device according to the subject invention is best illustrated in FIGURES 7 and 8. FIGURE 8 is a schematic representation of a device according to the subject invention, and FIGURE 7 is a schematic representation of two optical systems, a lens of each of the systems corresponding to one of the interaction gaps of the device according to the subject invention. It will be seen that one of the optical systems of FIGURE 7 is labeled "phase focusing" and represents the bunching action of the interaction gaps of the device according to this invention. The second optical system is labeled "radial focusing" and illustrates the radial focusing of the beam by the interaction gaps of a device according to this invention.

As was described with respect to FIGURE 6, the first interaction gap of a device according to this invention tends to phase focus or bunch the electrons of the beam by velocity modulation, and the second interaction gap tends to oppose the action of the first interaction gap and thus to de-phase focus or debunch the beam. Similarly, the third interaction gap and subsequent odd numbered gaps tend to phase focus the beam, while the fourth interaction gap and subsequent even numbered gaps tend to de-phase focus the beam. As has been shown in connection with FIGURE 6, the net result of such a system is a phase focused or bunched beam.

Referring to FIGURES 7 and 8, the phase focusing action of the interaction gaps 61–69 of a device according to this invention is illustrated by the lens system marked "phase focusing" and comprising lenses $61a$–$69a$. It will be seen that the lens system comprises alternate converging and diverging lenses, the lens $61a$ corresponding to the first interaction gap 61 and the lenses $63a$, $65a$, $67a$ and $69a$ corresponding to subsequent odd numbered gaps being converging. The lens $62a$ corresponding to the second interaction gap 62 and the lens $64a$, $66a$, $68a$ and $70a$ corresponding to subsequent even numbered gaps are diverging lenses. All of the lenses $62a$–$69a$ are of equal power, the first lens $61a$ and the last lens $70a$ having half the power of the other lenses. This is in accordance with the discussion above with respect to obtaining symmetry of the phase focusing by making the intermediate interaction gaps 62–69 of equal effect and making the effect of the first gap 61 and the last gap 70 half.

It will be seen that if a beam of light passes through the optical lens system described above it will be ultimately focused. This result is well known in the optical arts and is due to the fact that the effect of a converging lens can never be overcome by a subsequent diverging lens of equal strength since the converging lens will reduce the beam of light to a smaller cross-section on the diverging lens, thereby preventing the full power of the diverging lens from being used. Thus, the optical system illustrates the phase focusing action described with respect to FIGURE 6.

The optical lens system of FIGURE 7 labeled "radial focusing" is identical to the "phase focusing" lens system above described except that each converging lens has been replaced by a diverging lens of equal power, and vice versa. Thus, the first lens 61b of the "radial focusing" system corresponding to the first interaction gap is a diverging lens, the second lens 62b is a converging lens, etc. This has been done in accordance with the fact, well known in the velocity modulation art, that an interaction gap which velocity modulates a beam simultaneously tends to radially defocus the beam whereas an interaction gap which tends to oppose velocity modulation simultaneously tends to radially focus the beam. It will be seen that a beam of light in passing through this lens system will also be focused, in spite of the fact that the first lens 61b of the system is a diverging lens. This phenomenon is also well known in the optical arts. Thus, it will be seen that a device according to the subject invention will simultaneously phase focus and radially focus an electron beam.

The choice of an optical lens system to illustrate the radial focusing action of a device according to this invention is very appropriate in view of the fact that an interaction gap is actually an electrostatic lens. The focusing of an electron beam by applying a high direct current voltage across a gap between adjacent drift tube sections is well known in the art. Further, it is known that an electron passing across such electrostatic lens will be focused regardless of whether it is accelerated or decelerated by such lens.

This may be readily seen by referring to FIGURES 10–B and 10–C in which it is assumed that the electrons in the beam are traveling from left to right and that the voltage applied between the two drift tube sections 80 and 82 is held constant. If such voltage is held constant, the field lines extending between the two drift tube sections will exert a constant force having a constant direction on the electrons of the beam. Since the field lines are vectors comprising varying radial and axial components and extend from the negative drift tube section to the positive drift tube section the electrons in passing through such gap will tend to be focused by the field lines adjacent the negative boundary of the gap and defocused adjacent the positive boundary of the gap. If the electrons are accelerated by the voltage across the gap, as shown in FIGURE 10–B, they will be focused to a greater extent upon entering the gap at low velocity than they are defocused upon leaving the gap at high velocity because at low velocity the electrons will be subject to the radial focusing forces for a longer period of time than they will be subject to the defocusing forces which they will pass through at high velocity. Furthermore, the focusing of the beam upon entering the gap will reduce the diameter of the beam and will thus reduce the defocusing of the beam upon leaving the gap. The reason for this effect is that the lines of force shown in FIGURE 10 through 10–C have their greatest radial component near the walls of the drift tubes, so that when the beam diameter is reduced it is subject to less radial force. Therefore, the net result of the electrostatic lens shown in FIGURE 10–B wil be to focus the beam. Similarly, an electrostatic lens which decelerates the electrons as shown in FIGURE 10–C will focus the beam since the beam will be defocused less upon entering the gap at high velocity than it is focused upon leaving the gap at low velocity, and since the defocusing of the beam upon entering the gap will tend to increase the focusing of the beam upon leaving the gap.

However, if the voltage across an interaction gap is not constant as assumed above, but varies, then the electrostatic lens effect of the gap will be a combination of the direct current focusing action described above with a superimposed effect caused by the variation in voltage. It is this superimposed effect which contributes to beam spreading in a conventional velocity modulation device and which the subject invention overcomes. Since the direct current focusing action of the interaction gaps is well known in the art and is compatible with and beneficial to the operation of a device according to this invention, it will be neglected in the following discussion which therefore treats only the effect of the variation in voltage across an interaction gap upon the focusing of an electron beam.

It has been found that if the voltage across an interaction gap tends to become more positive while an electron is passing therethrough, the electron will experience a net defocusing action. Conversely, if the voltage across an interaction gap tends to become more negative while an electron passes through, the electron will experience a net focusing action. This is best illustrated in FIGURE 10 and 10–A in which it is assumed that the electrons in the beam are traveling from left to right.

FIGURE 10 illustrates the situation where the beam tends to be defocused due to the fact that the voltage on the second drift tube section 82 is becoming increasingly more positive with respect to that on the first drift tube section 80. Thus, an electron passing through the gap may experience a small focusing action upon entering the gap and a larger defocusing action upon leaving the gap (indicated by the solid field lines), as when the voltage across the gap increases from zero to some positive value, or it may be defocused a large amount upon entering the gap and focused a lesser amount upon leaving the gap (indicated by the dotted field lines), as where the voltage across the gap increases from a negative value to zero. The defocusing action will be the greatest, however, where the voltage across the gap passes through zero, as by increasing from a negative value to a positive value, shown specifically by the voltage wave at the top of FIGURE 10. In this situation the electron will be subjected to a defocusing action (dotted field lines) upon entering the gap and a second defocusing action (solid field lines) upon leaving the gap.

FIGURE 10–A illustrates the situation where the beam tends to be focused by the voltage variation across the gap due to the fact that the voltage on the second drift tube section 82 is decreasing from some value to a less positive value with respect to that on the first drift tube section. An electron passing through the gap may be focused a large amount upon entering the gap and defocused a small amount upon leaving the gap (indicated by the dotted field lines), as when the voltage decreases from some positive valued toward zero, or it may be defocused a small amount upon entering the gap and focused a large amount upon leaving the gap (indicated by solid field lines), as where the voltage across the gap decreases from zero to a negative value. Again, the focusing action will be the greatest when the voltage across the gap decreases from some positive value through zero to a negative value, shown specifically by the voltage wave at the top of FIGURE 10–A, so that the electron is focused both upon entering the gap (dotted lines) and upon leaving the gap (solid lines).

From the above, it will be seen that those electrons having a phase relationship with respect to the voltage across the interaction gap such that they pass through the gap when the voltage thereacross passes through zero will experience either the maximum focusing effect of the gap or the maximum defocusing effect due to voltage variations across the gap. As has been pointed out heretofore, a device according to the subject invention tends to cause all of the electrons of the beam to enter into bunches which have a phase relationship with respect to the voltage across the interaction gaps such that they pass through the interaction gap at each of the nulls of the voltage thereacross. Thus, it will be seen that the electrons in the bunches formed by a device according to this invention will first pass through an interaction gap in such phase relation to the voltage thereacross as to cause them to be focused, and will pass through the next succeeding gap in such phase relation to the voltage thereacross as to cause them to be defocused. Therefore, the lens system labeled "radial focusing" is duplicated by the electrostatic lens action of the interaction gap of a device according to the subject invention, and a net radial focusing of the beam will result.

There are many embodiments of this invention in addition to that shown in FIGURE 1 which will accomplish the multiple opposed phase and radial focusing according to the subject invention. For example, according to FIGURE 3 if the supporting means 90 for the drift tube sections are made considerably heavier than the support rods 30 shown in FIGURES 1 and 2, they will conduct sufficient electrical current to cause the voltage across adjacent interaction gaps to be 180° out of phase with each other rather than being in phase as was described with respect to FIGURES 1 and 2. Thus, it will be seen that if this structural feature is used it will require that the drift tube sections 92 according to this embodiment of the invention must be of such length that an electron of average velocity will pass from the center of one gap to the center of the next gap in the time required for one full cycle or whole number multiple thereof at the operating frequency in order for the opposing radial and phase focusing to take place.

Similarly, referring to FIGURE 4, a device according to the subject invention need not comprise a single cavity 18 as shown in FIGURE 1 but may instead be divided into a plurality of cavities 94, 95, 96 by partitions 97 taking the place of the metal rods 30 in supporting the drift tube sections 21, 22, etc. Thus, it will be seen that a separate cavity is associated with each interaction gap. In order to obtain the multiple opposing action at each of the interaction gaps according to the subject invention it will be necessary to drive all of such cavities. Where the length of the drift tube is such that an electron of average velocity will travel from gap center to gap center in the time required for one-half cycle or uneven whole number multiple thereof at the operating frequency, the cavities must be driven in phase with each other. This may be accomplished by driving the first cavity 94 through a coupling loop 98 and by interconnecting cavities by means of coupling loops 99 adapted to provide in-phase coupling between each of said cavities and adjacent cavities.

Another embodiment similar to that described in connection with FIGURE 4 is shown in FIGURE 5. According to this embodiment of the invention the drift tube sections 100 are of such length that an electron of average velocity will pass from gap center to gap center in the time required for one full cycle or whole number multiple thereof at the operating frequency. The coupling loop 102 between adjacent cavities 104, 106 is adapted to intercouple the cavities such that the voltage therein are 180° out of phase with each other. Thus, it will be seen that the electrons will be subjected to opposing effects at adjacent interaction gaps as they pass through the device.

Figure 9:
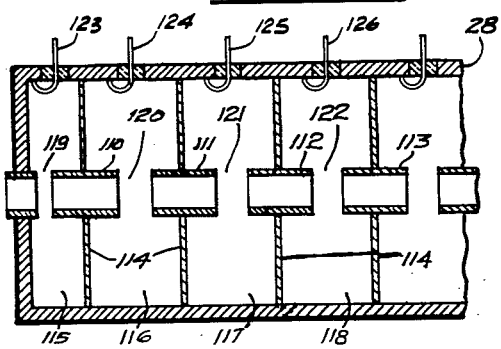
FIGURE 9 is a fragmentary cross-sectional view of yet another embodiment of this invention.

Referring to FIGURE 9, yet another embodiment of this invention is shown. This embodiment is similar to those shown in FIGURES 4 and 5, in that the drift tube sections 110, 111, 112, 113 are supported on partitions 114 which provide a separate cavity 115, 116, 117, 118 for each interaction gap 119, 120, 121, 122. However, according to this embodiment of the invention, the cavities are not interconnected but instead are each separately driven by coupling loops 123, 124, 125, 126. Thus, according to this embodiment of the invention the drift tube sections may be any desired length since the cavities may be driven in the proper phase relation to obtain the opposed action at different interaction gaps according to this invention. For example, if the time required for an electron of average velocity to travel from gap center to gap center is equal to the time required for one half cycle of the operating frequency, then the cavities must be driven in phase with each other. But if the electron transit time is a full cycle, then the cavities must be driven 180° out of phase with each other. It will be seen that any electron transit time may be compensated by a proper phase relation in the driving of the cavities to produce the opposing effects at different interaction gaps according to this invention.

Another embodiment of the subject invention is shown in FIGURES 11 and 12. This embodiment of the invention is somewhat different from those described thus far. According to this embodiment of the subject invention the electron beam is subjected to alternate accelerating and decelerating forces within the cavity provided by alternately arranged positively and negatively charged electrodes, instead of being intermittently shielded from the high frequency alternating field within the cavity by drift tube sections. Thus, according to this embodiment of the invention the conductive wall of the cavity 18 is divided into upper and lower halves 130 and 132, the upper half 130 being insulated as at 131 and at a positive potential with respect to the lower half 132 and the lower half being at a positive potential with respect to the electron gun 12. As in the embodiment shown in FIGURE 1, the cavity 18 is driven by a single coupling loop 32.

A plurality of metallic rings 135–144 are supported on the cavity sections as by means of rods 150 and 152. The first ring 135 and subsequent odd numbered rings are each supported by a pair of rods 150 mounted on the inner surface of the lower half 132 of the cavity wall. The second ring 136 and subsequent even numbered rings are each supported on a pair of rods 152 mounted on the inner surface of the upper half 130 of the cavity wall. Thus, it will be seen that the rings have alternate negative and positive voltages with respect to each other, as indicated in FIGURE 11.

The tube shown in FIGURE 11 operates similar to the tubes shown in the previous figures to the extent that in each case the beam is alternately phase focused and defocused (that is, velocity modulated to cause bunching and then velocity modulated to tend to debunch). The difference is primarily in the way in which velocity modulation is accomplished. In tubes of the type shown in FIGURE 1, for example, the beam is shielded by drift tubes from the high frequency alternating field in the cavity so that the electrical alternating field in the cavity will act upon the beam only when the beam passes through the gaps between the drift tubes. In this way the overall effect of the cavity alternating field on the beam can be controlled by properly positioning the gaps.

It is known in the art that the high frequency alternating field in a cavity has a greater effect upon electrons having high velocity along the axis of the beam than it does upon electrons having relatively slow axial velocity. This principle is utilized in the tube of FIGURE 11 to control the overall effect that the alternating field in the cavity has on the beam. The space around the D.C. negatively charged or decelerating rings 135, 137, 139, 141 and 143 defines the electrostatic decelerating field where the electrons travel at relatively low axial velocity and hence are relatively unaffected by the high frequency alternating field in the cavity. The space adjacent the D.C. positively charged or accelerating rings 136, 138, 140, 142, and 144 constitutes the electrostatic accelerating field where the electrons travel at relatively high axial velocity and hence are relatively strongly affected by the high frequency alternating field in the cavity. Thus, the D.C. negatively charged rings such as 135 establish an electrostatic decelerating field which extends on both sides of the ring and can be said to be analogous to the drift tubes such as 21 in FIGURE 1, and the D.C. positively charged rings such as 136 establish an electrostatic accelerating field which extends on both sides of the ring and which can be said to be analogous to the gaps such as 42 in FIGURE 1. Accordingly, the overall effect the high frequency alternating field in the cavity will have on the beam can be controlled by properly positioning the rings.

In the embodiment shown in FIGURE 11 the rings are evenly spaced from each other a distance such that an electron of average velocity will travel from one positive ring to the next positive ring in the time required for the high frequency alternating field in the cavity to complete one-half cycle or uneven whole number multiple thereof at the operating frequency. Therefore, the effect of the high frequency alternating field in the cavity upon an electron at each point at which it is traveling at high velocity (within the electrostatic accelerating field) will be 180° out of phase with the effect at the immediately preceding point of high velocity. It will be seen that, due to such multiple opposed effects, the phase focusing action of the embodiment shown in FIGURES 11 and 12 will be the same as was described with respect to the embodiment shown in FIGURE 1. In addition, the type of tube shown in FIGURE 11 has the benefit of the radial focusing effect caused by the electrostatic lenses formed by rings 135 to 144 which are at different direct current potentials.

It will be seen that in each of the embodiments thus far described the effect of each interaction gap on the beam is the opposite of the gaps adjacent thereto. However, it is also possible according to this invention to subject the beam successively to the same effect at adjacent interaction gaps and later subject the beam successively to the opposite effect at adjacent interaction gaps. In other words, referring to the embodiment shown in FIGURE 1, the first drift tube section might have a length such that the time required for an electron of average velocity to proceed from the first gap to the second gap is one full cycle of the operating frequency. Therefore, an electron would experience the same effect at the second interaction gap as it did at the first. The second drift tube section could then have a length corresponding to one half cycle of the operating frequency, and the third drift tube section could have a length corresponding to one full cycle, so that the effect at the third and fourth interaction gaps will oppose that at the first and second interaction gaps. It will be seen that a variety of combinations of effects could be made in the manner just described. However, the preferred arrangement is for each gap to oppose the action of the next preceding gap since it is believed that this arrangement provides the most desirable and efficient operation according to this invention.

It has been found that the efficiency of a device according to this invention tends to increase if the effect of each gap is decreased and the number of gaps is increased. This is clearly shown in the graph of FIGURE 13. In such graph the efficiency is plotted on the axis of ordinates and number of gaps is plotted on the axis of abscissas. Three curves 161, 162 and 163 are shown, each being plotted for a different magnitude of effect at an interaction gap.

The effect at an interaction gap is directly proportional to the amplitude of the voltage swing thereacross. The effect at an interaction gap may be expressed as a ratio between such control voltage and the beam voltage, which ratio may be called the "bunching parameter." Thus, the first curve 161 represents the operation of a device according to this invention such that the bunching parameter is 0.4, or in other words the voltage swing across an interaction gap is four-tenths of the beam voltage. The second curve 162 is representative of the operation of a device according to this invention such that the bunching parameter is 0.3 and the third curve 163 represents the operation of a device according to this invention such that the bunching parameter is 0.2.

Referring to curve 161, it will be seen that with a bunching parameter of 0.4 a maximum efficiency of about 68% will be obtained with seven interaction gaps. Similarly, referring to curve 162, if the bunching parameter is 0.3 a maximum efficiency of about 70% may be obtained with either nine or ten interaction gaps. Or, referring to curve 163, if the bunching parameter is 0.2 a maximum efficiency of about 76% may be obtained with fifteen interaction gaps.

From FIGURE 13 it will be seen that for any given beam voltage and any given amount of driving power there is a certain number of interaction gaps which will provide the highest efficiency. Furthermore, it will be seen that the highest efficiency is obtained when the product of the number of the interaction gaps and the bunching parameter is approximately equal to three. In other words, optimum bunching is obtained when the electrons of the bunch have been subjected to successive control voltages totaling approximately three times the beam voltage. Thus, control voltage, beam voltage and number of interaction gaps all seem to be interrelated so that if any two are given the other two may be computed for maximum efficiency.

According to the subject invention the bunched beam produced as described herein may be utilized in a variety of ways. For example, referring to FIGURE 1, the bunched beam may be used to drive a cavity 20 resonant at twice the driving frequency. As pointed out above, the operation of a device according to this invention produces two electron bunches for each cycle of the driving frequency. Therefore, when the modulated beam of a device according to the subject invention is passed through an interaction gap 40 associated with an output cavity 20 resonant at twice the driving frequency, energy will be coupled from the modulated beam into such output cavity in the manner of a conventional klystron. The power thus introduced may be coupled out of the output cavity 20 by an output coupling loop, as in conventional klystron operation.

Similarly, the modulated electron beam according to this invention might be used as the electron beam of a conventional klystron adapted to operate at twice the driving frequency. In other words, referring to FIGURE 1, the cavity 18 might be used as the first cavity of a klystron adapted to operate at twice the driving frequency. One or more intermediate cavities (not shown) of such klystron could be interposed between the cavity 18 and the output cavity 20 in order to further sharper up the bunches produced in the first cavity 18 according to this invention, and output might be extracted from the beam in the output cavity 20 as described above.

A device according to this invention may also be adapted to provide output power at the driving frequency as shown in FIGURES 14 and 15. Referring to the embodiment of this invention shown in FIGURE 14, the last drift tube section 24′ in the cavity 18 has a length such that an electron of average velocity will pass therethrough in the time required for one quarter of a cycle of the driving frequency (or any odd multiple of a quarter of a cycle). The reason for changing the drift tube 24′ to provide a ¼ cycle drift time instead of the ½ cycle drift time provided by the other drift tubes in FIGURE 14 is that the bunches will tend to pass gap 44 at nodal points of the driving cycle, as was explained in connection with FIGURE 6. By positioning gap 45 to be effective ¼ cycle out of phase with gap 44, the bunches will pass gap 45 at the antinodes of the driving cycle and thus will receive maximum acceleration or deceleration. Thus, the last interaction gap 45 in the cavity 18 will tend to accelerate certain of the electron bunches and decelerate others, tending to cause the alternate adjacent bunches to merge. In other words, the action of such last interaction gap will be to "bunch the bunches." Such "bunched bunches" may be used to drive an output cavity 170 resonant at the driving frequency. Power is coupled out of the modulated beam and into the output cavity through the interaction gap 171. Power may be coupled out of the output cavity by means of a conventional coupling loop 172. It will be remembered that it is necessary to "bunch the bunches" since the operation of the cavity 18 according to this invention produces two bunches of electrons for each cycle of the driving frequency.

According to the embodiment of this invention shown in FIGURE 15, the cavity 18 is identical to that shown in FIGURE 1. The modulated beam produced by such cavity 18 is directed through an intermediate cavity 180 tuned to resonate at the driving frequency and through an output cavity 181 into a collector 14. Such intermediate cavity 180 may be driven by means of a coupling loop 182 at the driving frequency and in phase therewith, in which case the drift tube section 183 between the cavity 18 and the intermediate cavity is such that an electron of average velocity will pass therethrough in the time required for one quarter of a cycle of the operating frequency (or any odd multiple of a quarter of a cycle). If the intermediate cavity is driven other than in phase with the driving voltage, an appropriate change must be made in the length of the drift tube section 183 in order to obtain the proper effect in the interaction gap 184. Thus, the action of the interaction gap 184 of the intermediate cavity is again to bunch the bunches produced in the cavity 18. The bunched bunches then proceed on into the output cavity 181, which is tuned to resonate at the driving frequency. Power will be extracted from the bunched bunches in the interaction gap 185 of the output cavity 181 in the manner of a conventional klystron, which power may be coupled into a load by any conventional means such as the coupling loop 186, for example.

Further, a modulated beam according to the subject invention may be passed directly into a particle accelerator. Referring to FIGURE 16, it will be seen that the modulated beam from a cavity 18 such as the one shown in FIGURE 1 might be directed into a particle accelerator as shown, the bunches of electrons providing a pulsed beam for such particle accelerator. The particle accelerator will then act on such beam as is well known in the art.

It is pointed out that the method of and means for modulation according to this invention is equally applicable to beams composed of any type of charged particle. For example, a beam composed of ions could be modulated in accordance with the teaching of this invention. The modulation of an electron beam is specifically described herein since electron devices are more familiar to those skilled in the art.

It is also pointed out that other types of interaction means in addition to those specifically described herein may be used to modulate a beam of charged particles in accordance with this invention. For example, a helix having periodic variations in pitch or a plurality of spaced helix sections might be used to obtain modulation in accordance with this invention.

It is believed that the advantages of a device according to the subject invention will be obvious to those skilled in the art. The high efficiency and simple construction of embodiments of this invention will render it readily adaptable to many systems new and old. It is believed that the new and improved method of and means for modulating an electron beam as described herein constitutes a new and extremely valuable contribution to the art.

What is claimed is:

1. A method of operating a charged particle beam modulating device having an interaction section adapted to be energized at a given modulating frequency to density modulate and focus a homogeneous beam of given velocity to produce two bunches of charged particles for each cycle of the modulating frequency, said method comprising the steps of exposing the beam to said modulating frequency at a plurality of points spaced from each other along the beam to velocity modulate the particles of the beam, the spacing between said points and the phase relationship between the velocity modulation at said points being mutually adjusted such that, with respect to a particle traveling at said beam velocity, the velocity modulation at a number of said points tends to counteract the velocity modulation at the remaining points, the magnitude of the velocity modulation at one of said points having a given value and the magnitude of the velocity modulation at an adjacent point having a value substantially twice said given value.

2. The method according to claim 1, in which said velocity modulated particles are shielded from said modulating frequency for an interval between said spaced points of exposure thereto whereby said particles tend to become density modulated, said shielding interval and the phase relationship between said velocity modulations being such that, with respect to a particle moving at a velocity corresponding to said given beam velocity, each successive velocity modulation tends to counteract the preceding velocity modulation.

3. The method according to claim 1, in which said beam is an electron beam, said beam is repeatedly exposed to said modulating frequency to repeatedly velocity modulate the beam, and the velocity modulation at any one of said points is substantially 180 degrees out of phase with the velocity modulation at an adjacent point.

4. The method according to claim 3, in which the magnitude of the velocity modulation at the first of said points is substantially half the magnitude of the velocity modulation at all but one of the remaining points.

5. The method according to claim 4, in which said one remaining point constitutes the last point and the magnitude of the velocity modulation at said last point is half the magnitude of the velocity modulation at the points intermediate the first and last points.

6. A charged particle beam modulating device comprising means for forming an electron beam composed of electrons having a given velocity, a plurality of tubular sections through which said beam passes, said tubular sections being spaced apart to form gaps between them, and resonant cavity means of given resonant frequency surrounding said gaps, the distance between the centers of said gaps being such that an electron traveling at said given velocity will reach each succeeding gap when the field across said gap at said given resonant frequency is counteracting the field across the preceding gap, the voltage across the first gap and the length of the first gap being adjusted such that the velocity modulation of said beam at said first gap is substantially half the velocity modulation of the beam at succeeding gaps.

7. A charged particle beam modulating device comprising a resonant cavity having a given resonant frequency, a plurality of aligned tubular members spaced along said cavity so that the field across the gap between any two of said tubular members will be in phase with the field across the gap between any other two of said members when said cavity is excited, and means for projecting into said resonant cavity coaxially with said tubular members an electron beam composed of electrons having a given velocity, the distance between the centers of said gaps being such that the transit time between said centers for an electron traveling at said given velocity is one half cycle of said resonant frequency of said cavity or an uneven whole multiple thereof, the length of the first of said gaps being substantially half the length of succeeding gaps.

8. A charged particle beam modulating device comprising means for forming an electron beam composed of electrons having a given velocity, a plurality of tubular sections through which said beam is directed, said tubular sections being spaced apart to form gaps between them, and resonant cavity means of given resonant frequency surrounding said gaps, said resonant cavity means providing an electric field at each gap which is 180 degrees out of phase with the field at adjacent gaps, the distance between the centers of said gaps being such that an electron traveling at said given velocity will traverse said distance in the time required for one cycle of said given resonant frequency or a whole number of cycles, the voltage across the first gap and the length of the first gap being adjusted such that the velocity modulation of said beam at said first gap is substantially half the velocity modulation of the beam at succeeding gaps.

9. A charged particle beam modulating device comprising means for forming a beam composed of charged particles having a given velocity, a cavity resonant at a given frequency and through which said beam passes, means for driving said cavity at said resonant frequency to establish alternating electric fields therein, and means within said cavity for obtaining maximum interaction between said beam and said alternating fields within said cavity at intervals only, said intervals being spaced from each other a distance such that a particle traveling at said given velocity will pass from the center of one of said intervals to the center of the next in the time required for one half cycle of said given frequency or an uneven whole number of half cycles, the first of said intervals having a length substantially half the length of subsequent intervals.

10. A charged particle beam modulating device comprising means for forming a beam composed of charged particles having a given velocity, a cavity resonant at a given frequency and through which said beam passes, means for driving said cavity at said given frequency, and direct current means within said cavity to alternately accelerate and decelerate portions of said beam at spaced intervals therealong, the distance from the center of an accelerating interval to the center of the next accelerating interval being such that a particle traveling at said given velocity will pass from center to center in one half cycle of said given frequency or an uneven whole number of half cycles, the first of said intervals having a length substantially half the length of subsequent intervals.

11. A charged particle beam modulation device comprising means for forming an electron beam composed of electrons having a given velocity, a cavity resonant at a given frequency and through which said electron beam passes, means driving said cavity at said resonant frequency, and a plurality of tubular drift tube sections surrounding said beam within said cavity, said drift tube sections being supported on metal rods of small diameter mounted on the inner surface of said cavity, said drift tube sections being spaced from each other and from the ends of said cavity to form interaction gaps, said rods being small enough that the fields across said gaps are all in phase, the spacing between one end of the cavity and the first drift tube section forming the first interaction gap and the spacing between the other end of the cavity and the last drift tube section forming the last interaction gap being one half the spacings between the drift tube sections forming the intermediate gaps, said drift tube sections all being of such length that an electron traveling at said given velocity will pass from center to center of adjacent interaction gaps in the time required for one half cycle of said given frequency or uneven whole number of half cycles.

12. A charged particle beam modulating device comprising means for forming an electron beam composed of electrons having a given velocity, a cavity resonant at a given frequency and through which said electron beam passes, means driving said cavity at said resonant frequency, a plurality of tubular drift tube sections surrounding said beam within said cavity, and means supporting said drift tube sections within said cavity, said supporting means comprising conductive members of large surface area mounted on the inner surface of said cavity and adapted to provide a low impedance path for current flow at said given frequency between said inner surface and said drift tube sections, said drift tube sections being spaced from each other and from the ends of said cavity to form interaction gaps, the spacing between one end of the cavity and the first drift tube section forming the first interaction gap and the spacing between the other end of the cavity and the last drift tube section forming the last interaction gap being one half the spacings between the drift tube sections forming the intermediate gaps, said drift tube sections all being of such length that an electron traveling at said given velocity will pass from center to center of adjacent intermediate gaps in the time required for one whole cycle of said given frequency or a whole number of cycles.

13. A charged particle beam modulating device comprising means for forming an electron beam composed of electrons having a given velocity, a plurality of tubular drift tube sections through which said beam passes, said drift tube sections being spaced from each other to provide interaction gaps, a plurality of cavities resonant at a given frequency, each of said cavities being associated with one of said interaction gaps, and means driving all of said cavities at said given frequency and in phase with each other, all of said drift tube sections being of such length that an electron traveling at said given velocity will pass from center to center of adjacent interaction gaps in the time required for one half cycle of said given frequency or uneven whole number of half cycles, the driving power and gap length at the first of said gaps being adjusted such that the velocity modulation of said beam at the first of said gaps is substantially half the velocity modulation of said beam at succeeding gaps.

14. A charged particle beam modulating device comprising means for forming an electron beam composed of electrons having a given velocity, a plurality of tubular drift tube sections through which said beam passes, said drift tube sections being spaced from each other to provide interaction gaps, a plurality of cavities resonant at a given frequency, each of said cavities being associated with one of said interaction gaps, and means driving all of said cavities at said given frequency, adjacent cavities being driven 180 degrees out of phase with each other, all of said drift tube sections being of such length that an electron traveling at said given velocity will pass from center to center of adjacent interaction gaps in the time required for one cycle of said given frequency or whole number of cycles, the driving power and gap length at the first of said gaps being adjusted such that the velocity modulation of said beam at the first of said gaps is substantially half the velocity modulation of said beam at succeeding gaps.

15. A charged particle beam modulation device comprising means for producing a beam composed of charged particles of given velocity, interaction means through which said beam passes, said interaction means subjecting said particles of said beam to velocity modulation at spaced points, the phase relationship of said velocity modulation at one of said points with respect to that at another of said points and the spacing between said one point and said other point being such that with respect to a particle traveling at said given velocity the velocity modulation at said one point tends to counteract the velocity modulation at said other point, the magnitude of the velocity modulation at the first of said points being substantially half the magnitude of the velocity modulation at succeeding points, and means for utilizing said beam after it has passed through said interaction means.

16. A charged particle beam modulation device as claimed in claim 15 wherein said means for utilizing said beam is a particle accelerator into which said beam is injected.

17. An electron tube comprising means for producing a beam of electrons of given velocity, interaction means through which said beam passes, said interaction means being driven at a given frequency and subjecting said electrons of said beam to velocity modulation at spaced points, the magnitude and phase relationship of said velocity modulation at one of said points with respect to that at another of said points and the spacing between said one point and said other point being such that with respect to an electron traveling at said given velocity the velocity modulation at said one point tends to counteract the velocity modulation at said other point and the velocity modulation at the first of said points is substantially half the velocity modulation at succeeding points, output means for extracting power from said beam, said output means being tuned to operate at a frequency which is twice said given frequency, and means for collecting said beam after it has passed through said output means.

18. An electron tube comprising means for producing a beam of electrons of given velocity, a first interaction means, an intermediate interaction means, an output interaction means, and a collecting means, said electrons of said beam passing through said first interaction means, said intermediate interaction means and said output interaction means in that order and being collected by said collecting means, said first interaction means being driven at a given frequency and subjecting said electrons of said beam to velocity modulation at spaced points, the magnitude and phase relationship of said velocity modulation at one of said points with respect to that at another of said points and the spacing between said one point and said other point being such that with respect to an electron traveling at said given velocity the velocity modulation at said one point tends to counteract the velocity modulation at said other point, the velocity modulation at the first of said points being substantially half the velocity modulation at succeeding points, said intermediate interaction means being driven at said given frequency, the phase relationship of the driving frequency at and spacing between the first interaction means and the intermediate interaction means being such that the velocity modulation at the intermediate interaction means is an odd multiple of one quarter cycle out of phase with that of the first interaction means, said output interaction means being tuned to operate at said given frequency.

19. An electron tube comprising an electron gun for forming an electron beam composed of electrons having a given velocity, a collector electrode for receiving said beam, a first interaction means interposed between said gun and said collector, and an output interaction means interposed between said first interaction means and said collector; said first interaction means comprising a cavity resonant at a given frequency and through which said electron beam passes, means for driving said cavity at said resonant frequency to establish alternating electric fields therein, and means within said cavity for obtaining interaction between said beam and said alternating fields within said cavity at intervals only, the magnitude of the interaction between said beam and said fields in the first of said intervals being substantially half the magnitude of such interaction in succeeding intervals, said intervals other than the last one thereof being spaced from each other a distance such that an electron traveling at said given velocity will pass from the center of one of said intervals to the center of the next in the time required for one half cycle of said given frequency, said last interval being spaced from the next preceding interval such that an electron traveling at said given velocity will pass between the centers thereof in the time required for an odd multiple of one quarter cycle of said given frequency; said output interaction means being tuned to operate at said given frequency.

References Cited in the file of this patent
UNITED STATES PATENTS

| | | |
|---|---|---|
| 2,222,902 | Hahn | Nov. 26, 1940 |
| 2,284,751 | Linder | June 2, 1942 |
| 2,455,269 | Pierce | Nov. 30, 1948 |
| 2,547,061 | Touraton et al. | Apr. 3, 1951 |
| 2,621,304 | Altousky | Dec. 9, 1952 |
| 2,762,948 | Field | Sept. 11, 1956 |
| 2,785,335 | Dicke | Mar. 12, 1957 |
| 2,843,788 | Peter | July 15, 1958 |